United States Patent Office 3,450,020
Patented June 17, 1969

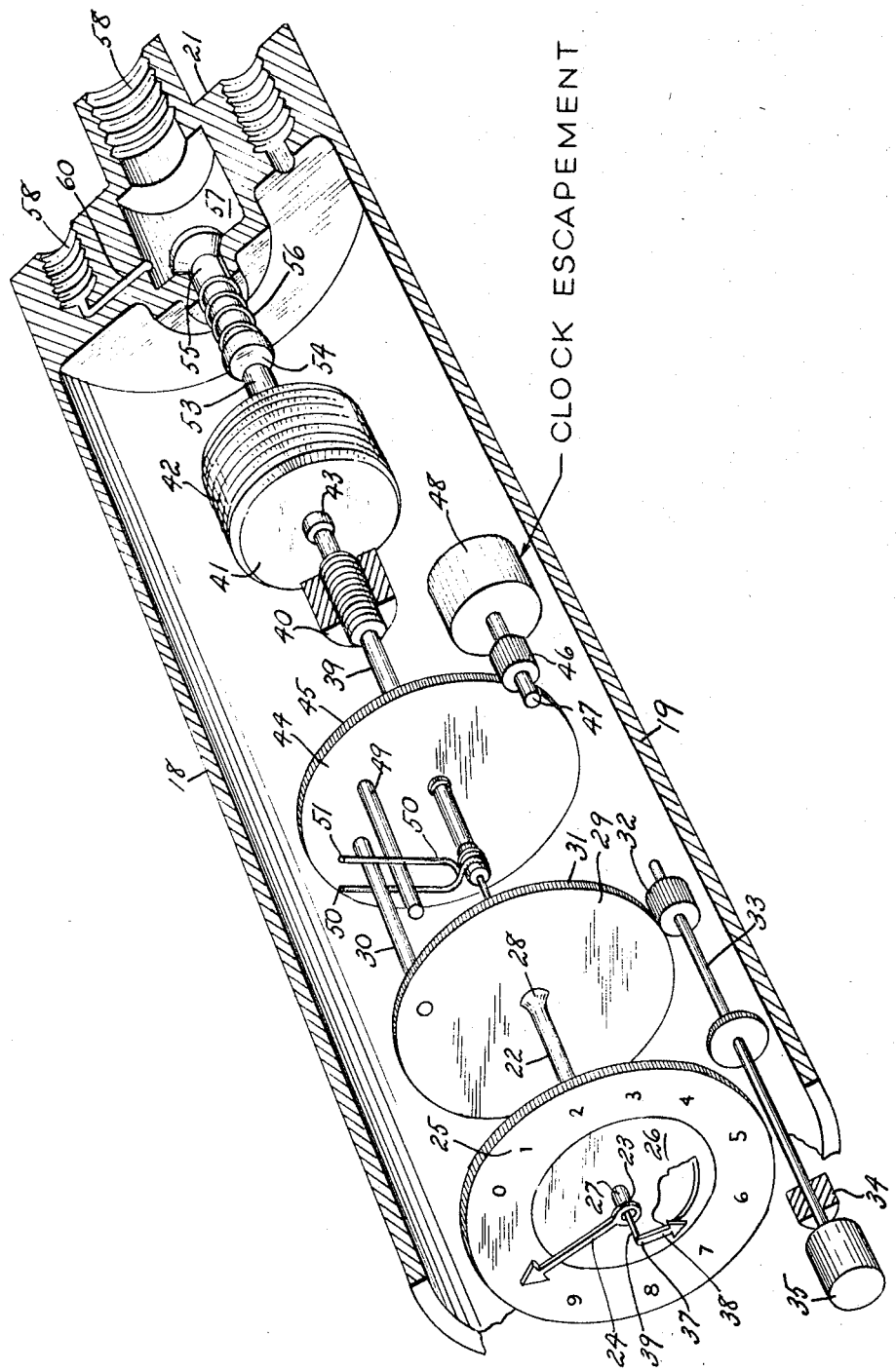

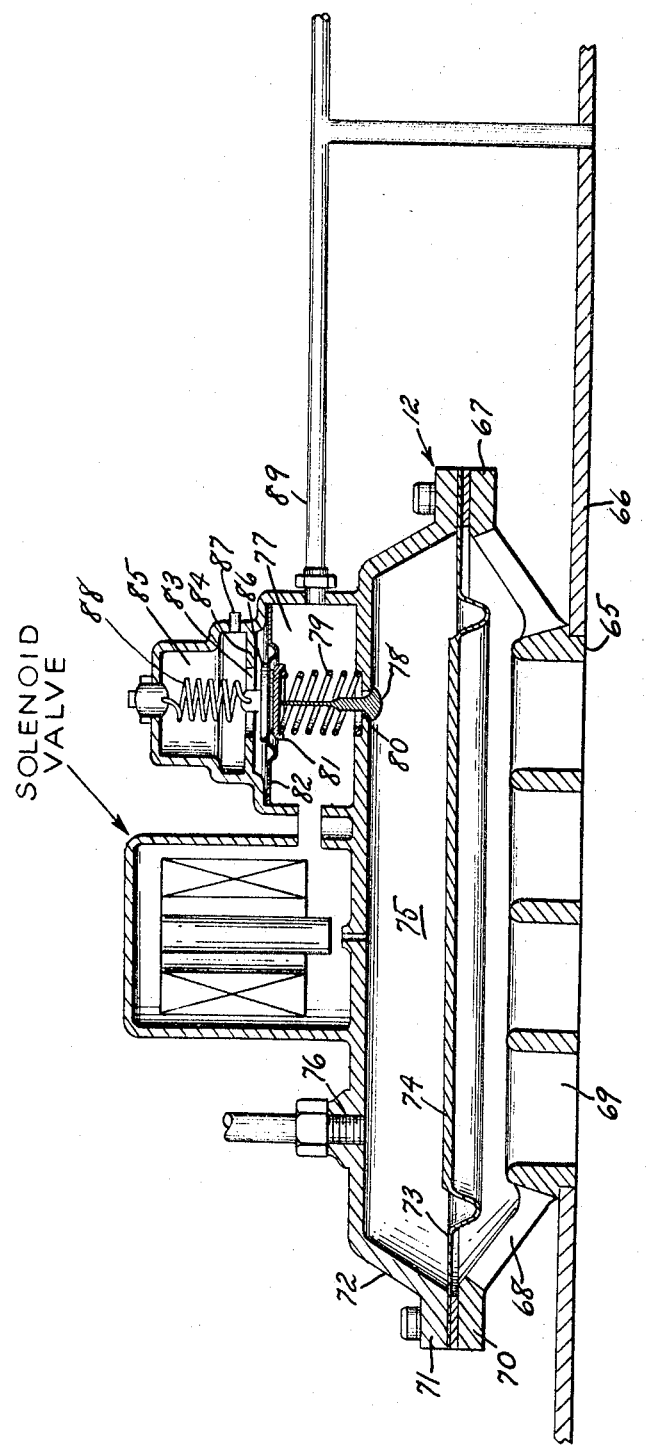

3,450,020
AIRCRAFT CABIN PRESSURIZATION SYSTEM HAVING CONTROLLED RATE OF PRESSURE CHANGE
John H. Andresen, Jr., Hewitt, N.J., assignor to Intercontinental Dynamics Corporation, Englewood, N.J., a corporation of New Jersey
Filed Oct. 10, 1967, Ser. No. 674,163
Int. Cl. B64d 13/04
U.S. Cl. 98—1.5      2 Claims

ABSTRACT OF THE DISCLOSURE

A cabin altitude pressure control system employing clockwork or similar means for causing aircraft cabin altitude to progress to a desired level at a predetermined rate, thereby eliminating rapid or pulsating changes.

---

This invention relates generally to the field of aircraft pressurization systems, and more particularly to an improved pneumatic system in which cabin pressure may be altered in accordance with a predetermined rate, normally below the usual rate of climb or descent of the aircraft, so as to minimize discomfort to the passengers which would otherwise occur if a rapid change in pressure were permitted.

It is among the principal objects of the present invention to provide an improved system incorporating relatively low cost components, whereby the invention may have consequent wide sale, distribution and use.

Another object of the invention lies in the provision of an improved aircraft pressurization system which may employ a minimum of simple mechanical linkages in the control elements thereof, whereby installation, servicing and maintenance may be of a minimal nature.

Yet another object of the invention lies in the provision of an improved cabin pressurization system in which the operation of the control valve is influenced by a clockwork escapement means which prevents excessively rapid changes in an aneroid element, whereby the progressive change in cabin altitude to a desired point cannot exceed a predetermined rate.

A feature of the disclosed embodiment lies in the provision of manual override means which may be conveniently placed in operation upon the occurrence of a malfunction in the automatic system.

These objects and features, as well as other incidental ends and advantages, will more fully appear in the progress of the following disclosure, and be pointed out in the appended claims.

In the drawing, to which reference will be made in the specification, similar reference characters have been employed to designate corresponding parts throughout the several views.

FIGURE 2 is a schematic sectional view in perspective of the cabin altitude controller element.

FIGURE 3 is a fragmentary sectional view of a control valve element.

Figure 1:
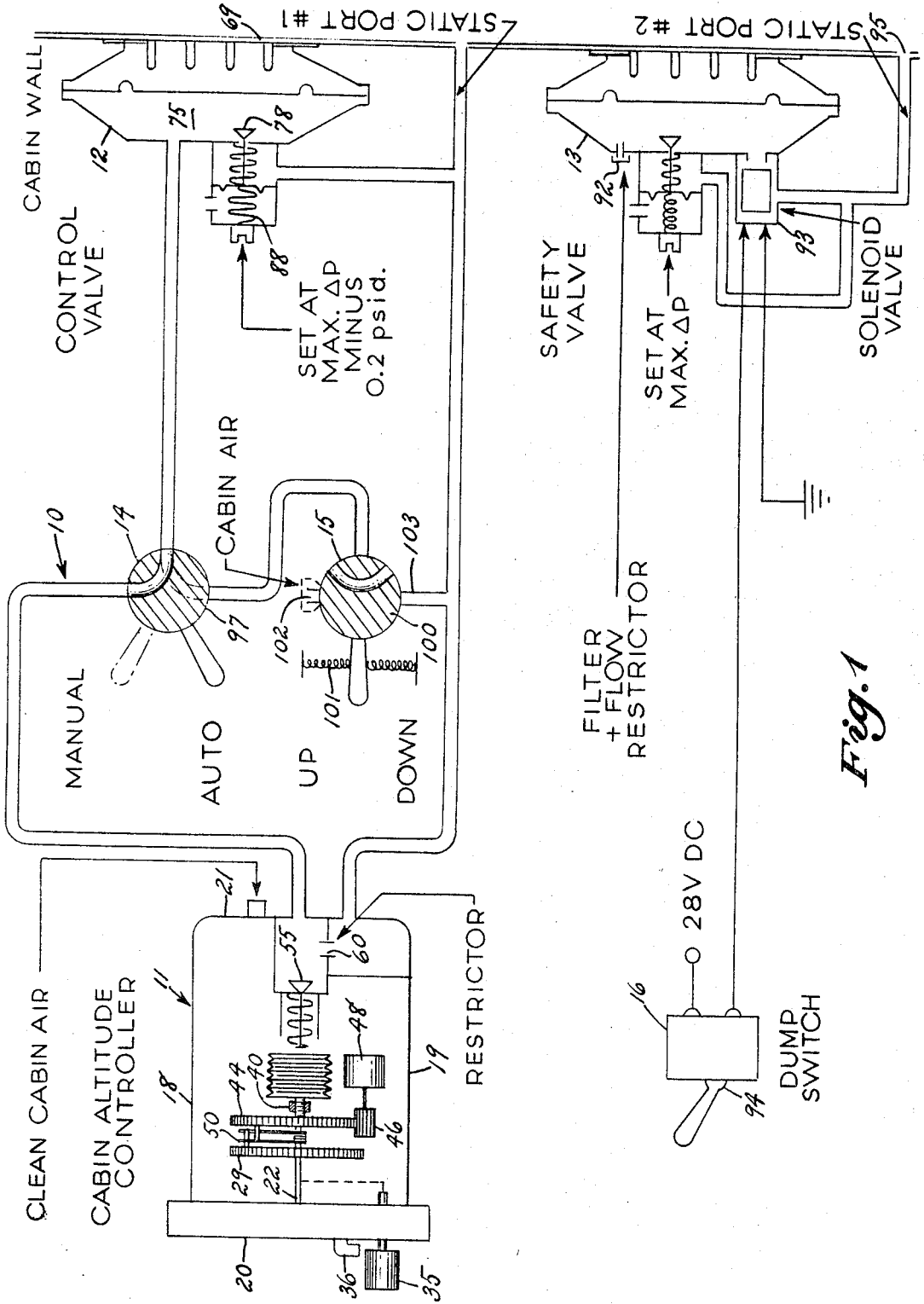
FIGURE 1 is a schematic diagram showing all of the individual elements comprising the embodiment.

In accordance with the invention, the device, generally indicated by reference character 10, comprises broadly: a cabin altitude controller element 11, an outflow control valve element 12, a safety valve element 13, manual-automatic selector valve means 14, manual control means 15, and manual safety valve override means 16.

The cabin altitude controller element 11 includes a tubular housing 18 bounded by a cylindrical wall 19 and first and second end walls 20–21, respectively. Axially aligned with the cylindrical wall 19 is an outer hollow shaft 22, the outer end 23 of which mounts a pointer 24 cooperating with an altitude scale 25 on a fixed scale plate 26. The shaft 22 penetrates an opening 27 in the plate 26, and secured to the inner end 28 thereof is a first gear 29 having a rearwardly extending pin 30 thereon positioned in eccentric relation adjacent the toothed periphery 31 thereof. The gear 29 meshes with a small pinion 32 on a parallel shaft 33 journaled in a high friction bearing 34, and mounting a manually engageable knob 35 on an outer end thereof.

Passing through the hollow shaft 22 is an inner shaft 39, the outer end 37 of which mounts a pointer 38. The inner portion 39 thereof passes through a threaded bushing 40, and the terminal is fixed to a central portion of the end plate 41 of a bellows 42.

A second gear 44 is mounted on the inner shaft the outer periphery 45 thereof meshing with a pinion 46 on a shaft 47 which forms part of a clock escapement 48. A pin 49 extends eccentrically from the gear 44 in a manner to permit it to underlie the pin 30, as shown in FIGURE 2. Surrounding the shaft 36 is a coiled torsion spring 50, having first and second legs 50–51, respectively, and adapted to engage the pins 30 and 49 to urge the same to congruent relation with shaft 39.

The opposite end 53 of the bellows 42 bears against the stem 54 of a poppet valve 55 having a spring 56 normally urging the same to closed position with respect to a chamber 57 in the wall 21. A threaded interconnection 58 leads to the controlled valve element 12 from the chamber 57. An aircraft static pressure inlet 58 is provided with a flow restricting bore 60 communicating with the chamber 57. Cabin air is introduced into the housing 18 by a threaded port 61 to influence the bellows 42.

The outflow control valve element 12 is of a type known in the art, and as best seen in FIGURES 1 and 3, the same is mounted within an orifice 65 in the cabin wall 66 of an aircraft. A casing 67 includes a first member 68 forming an outflow grill 69 at the central portion thereof. A flanged portion 70 mates with a flanged portion 71 on a second member 72, sandwiching therebetween a flexible multi layer diaphragm 73. The diaphragm 73 includes a centrally disposed relatively rigid portion 74 adapted to overlie the grill 69 and form a reference chamber 75 thereabove. A threaded outlet 76 communicates with the cabin controller element, as seen in FIGURE 1. An externally disposed chamber 77 is provided with a poppet valve 78 resiliently urged by a compression spring 79 to close the lower end 80. The opposite end 81 mounts a flexible diaphragm 82 overlying an opening 83 in a septum 84 leading to a second chamber 85. Rigidity of the central portion of the diaphragm is obtained by a plate 86. The second chamber 85 is vented to cabin air by an inlet 87. A calibration spring 88 enables the valve 78 to vent static pressure from the static pressure conductor 89 to the reference chamber upon the occurrence of excessive cabin pressure, thereby permitting the diaphragm 73 to uncover the outflow grill, and vent excessive pressure to the outside of the cabin.

The safety valve element 13 is very similar in construction to the control valve, and for convenience in manufacture, a single valve construction may be employed, and connected in accordance with required use. Thus, as best seen in FIGURE 1, a combination filter and flow restrictive device 92 communicates with cabin air pressure, instead of being connected to the cabin altitude control element. A solenoid valve 93 is operated by a dump switch 94 to vent the reference chamber to a static port 95. Thus, in the event of a complete failure of the automatic system and a rapid build up of the cabin pressure, or of a fire on board, it is possible for the pilot to immediately vent the cabin to a safe pressure level by operating the switch, the action being very rapid.

At any time the system may be operated manually, using the means 14 and 15. As seen in FIGURE 1, a rotary valve 97 is moved upwardly from "auto" to "manual" position, which disconnects the cabin altitude controller element 11, and connects the outflow control valve element 12 to the manual control means 15. The manual control means 15 includes a similar valve 100 normally maintained in closed condition by resilient means 101. Moving the handle thereof downwardly will connect the control valve element 12 with a cabin air port which closes the outflow valve and moving the same upwardly will connect it with a static port 103 which opens the outflow control valve.

Referring to FIGURE 1, both the control valve element and the safety valve element are provided with automatic means operated by the presence of excess pressure in the cabin, whereby the reference chambers of the valves can be vented to static pressure. In the case of the control valve element, the calibrating spring is adjusted to permit bleeding to static pressure at approximately 0.2 pound per square inch below maximum permissible pressure. The corresponding structure in the safety valve is adjusted to vent at maximum permissible pressure. Thus, upon failure of the cabin altitude controller to function, the excessive cabin pressure will be vented by operation of the control valve, and upon failure of the control valve to function by itself, a slight increase in pressure will operate the safety valve. Should the safety valve in turn be inoperative (with respect to automatic operation), the dump switch permits complete manual control independently of the means 14 and 15.

Operation

Assume that the cabin altitude is at 1,000 feet, the aircraft at 10,000 feet, and the pointer 24 set to 1,000 feet (an equilibrium condition). In this condition, the evacuated bellows 42 will have expanded so that it is just contacting the stem 54 of the poppet valve 55. Cabin air is then flowing through the flow restrictor 60 to static and the pressure to the control valve 12 is such as to keep the poppet valve open the exact amount to hold the desired pressure in the cabin. Should the control valve open slightly more than necessary for this condition, the cabin pressure will rise to above that corresponding to 1,000 feet. This causes the bellows to expand and open the poppet valve further, thus increasing the pressure to the control valve, which in turn has the effect of closing the control valve diaphragm 74 sufficient to return the cabin pressure to the equivalent of 1,000 feet.

Conversely, should the pressure of the cabin go below that corresponding to 1,000 feet, the bellows will contract, closing the poppet valve and restricting flow therethrough. This causes the pressure to the control valve to decrease, and thus open the control valve to bring the cabin pressure up to correspond to 1,000 feet altitude.

Actually, this operation is a smooth, proportional movement, and no hunting of the cabin altitude pressure occurs. When a change in the cabin altitude is desired, it is necessary only to turn the knob 35 to result in resetting the pointer 24 at the required new value. This will displace the pin 30 relative to the pin 49 (see FIGURE 2), and the legs of the spring 50 being tensed will tend to rotate gear 44 in a direction tending to move pin 49 to again underlie pin 30. Rotation at other than a predetermined rate is prevented by the interconnection of gear 45 to the clock escapement 48.

Assume that the desired cabin pressure corresponds to an altitude above that presently existing. The gear 29 will rotate clockwise as seen in FIGURE 2 and gear 44 will tend also to rotate in this direction. Corresponding rotation of the shaft 39 will result in moving member 41 rightwardly to establish a predetermined point of equilibrium such that when the desired pressure is reached, the relative expansion of the bellows will cause the end 53 to just contact the stem 54 of the valve 55.

Except for the presence of the escapement 48, the instantaneous degree of expansion of the bellows 42 would open the valve 55 and cause it to remain fully open until equilibrium is reached, resulting in a faster equalization rate than is comfortable to the occupants of the aircraft cabin. As rotation of the shaft 39 is slowed by the escapement, the valve 55 is permitted only limited opening whereby equilibrium is reached at the predetermined rate. Pointer 38 indicates the instantaneous progressive pressure change in terms of altitude. When the pointer 38 overlies the pointer 24, pin 30 will overlie pin 49, and equilibrium (desired cabin pressure) will then have been reached.

I claim:
1. In an aircraft cabin pressurization system including a control valve for venting the interior of a cabin to the outside atmosphere, improved valve controlling means for opening and closing said valve in accordance with a predetermined rate of change of cabin pressure to a predetermined terminal pressure; said controlling means including an aneroid component respective to instantaneous cabin pressure, and means communicating the condition of said aneroid component to said control valve, adjustable means for manually establishing terminal cabin pressure, means connected to said aneroid component for determining the effect of expansion and contraction thereof, and having motion imparting means for driving the same to a fixed relation relative to said adjustable means, and spring driven timing means regulating said motion imparting means at a predetermined rate.

2. Structure in accordance with claim 1, said controlling means including a housing, means for establishing terminal cabin pressure including a dial, a first gear, first pin means eccentrically mounted with respect to the axis of rotation of said first gear, pointer means connected to said first gear and positioned in cooperative relation with said dial, means for rotating said first gear to selectively determine the angular location of said first pin; a second gear substantially coaxially arranged with respect to said first gear and having a second pin means, means driving said second gear at predetermined rate in a direction wherein said second pin moves to congruent relation with respect to said first pin, aneroid means responsive to instantaneous cabin pressure, threaded shaft means interconnected to said aneroid means to shift the equilibrium position thereof, and valve means connected to said aneroid means for metering cabin pressure to said control valve element.

References Cited

UNITED STATES PATENTS

| | | | |
|---|---|---|---|
| 3,053,162 | 9/1962 | Andresen | 98—1.5 |
| 3,141,399 | 7/1964 | Andresen | 98—1.5 |
| 3,376,803 | 4/1968 | Emmons | 98—1.5 |

MEYER PERLIN, *Primary Examiner.*